Feb. 26, 1946. H. J. DE N. McCOLLUM 2,395,416
AIRCRAFT HEATING SYSTEM
Filed Nov. 19, 1941
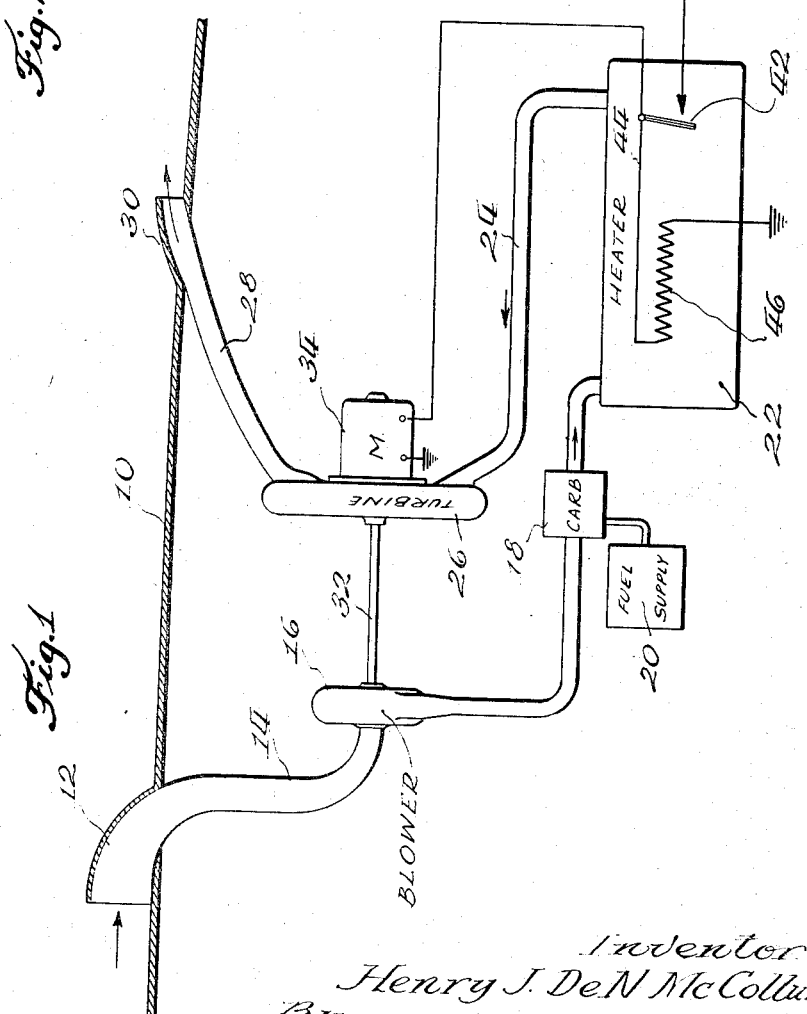

Patented Feb. 26, 1946

2,395,416

UNITED STATES PATENT OFFICE 2,395,416

AIRCRAFT HEATING SYSTEM

Henry J. De N. McCollum, Chicago, Ill.; Thelma McCollum executrix of said Henry J. De N. McCollum, deceased Application November 19, 1941, Serial No. 419,731

5 Claims. (Cl. 158—28)

My invention relates generally to aircraft heating apparatus, and more particularly to improvements in aircraft heaters of the internal combustion type for heating the cabins of airplanes.

It is an object of my invention to provide an aircraft heating system employing an internal combustion type heater in which the exhaust gas from the heater is utilized as a source of power for operating a supercharging blower.

A further object is to provide an improved aircraft heating system which operates automatically and does not constitute a drain upon the electrical generator of the aircraft after the system has attained normal operation.

Other objects will appear from the following description, reference being had to the accompanying drawing, Fig. 1 which is a diagrammatic illustration of the heating system as installed upon an airplane, and Fig. 2 is a central longitudinal sectional veiw of an exemplary form of heater.

An outer fuselage wall 10 is provided with an aperture to receive a ram 12 opening in the direction of flight, the ram being connected by the conduit 14 with the inlet of a blower 16. The outlet of the blower 16 leads to a carburetor 18, where the air discharged by the blower is mixed with a liquid fuel such as gasoline drawn from a fuel tank 20. The carburetor is preferably of the balanced float bowl type. The combustible mixture supplied by the carburetor 18 is conducted to a heater unit 22, which is of the internal combustion type, such as is shown in my co-pending application, Serial No. 378,262, filed February 10, 1941, which has matured into Patent No. 2,379,017, and illustrated in Fig. 2. In Fig. 2, the heater comprises a casing 17 secured to a combustion chamber 19 to which a combustible mixture is supplied through an inlet conduit 21. The products of combustion flow from the combustion chamber freely through a plurality of passageways 23 of relatively large total cross sectional area and are discharged from the heater casing through a conduit 25.

The products of combustion from the heater unit 22 are conveyed through a conduit 24 to the nozzle of an impulse or reaction turbine 26, the outlet of the turbine being connected by a conduit 28 to an opening in the fulselage wall 10. This opening is partially covered by the suitable deflector 30, so that an area of reduced pressure will be formed adjacent the end of the conduit 28 to assist in the flow of the mixture through the system.

The rotors of the blower 16 and of the turbine 26 are connected by a shaft 32, which may form an extension of the armature shaft of a motor 34. The motor 34 is adapted to be energized from a suitable source of electrical energy connected to main conductors 36, 37, the latter being illustrated as grounded. The conductor 36 is connected through a fuse 38 and a manually operable switch 40 to the bimetal thermostatic switch 42, the latter being in a closed position when cold. The switch 42 is connected to a conductor 44 leading to the motor 34 and to an electrically operated resistance igniter 46. While the switch 42 is illustrated as a simple bimetal contact switch, it is preferably in the form of a snap switch, of the micro-switch type, operated by a thermostatic bimetal element.

To place the heating system in operation, it is necessary merely to close the switch 40, whereupon the motor 34 and igniter 46 will be energized. Energization of the motor 34 will cause rotation of the blower 16, whereupon air under pressure will be forced to the carburetor 18, will be mixed with fuel, and supplied to the heater unit 22. After a short time, the igniter 46 will be heated to incandescence and ignite the fuel mixture. The gases of combustion flowing through the conduit 24 (which is preferably made as short as possible) impinge upon the blades of the rotor or turbine 26 to drive the latter, and are exhausted to the atmosphere through conduit 28.

After the heater has attained substantially normal operating condition, the bimetal thermostatic switch 32 will open, deenergizing the motor 34 and igniter 46. The system will, however, continue operating, since the turbine 26 will be driven by the gases of combustion to operate the blower 16. It will be understood that the velocity head of the air entering the ram 12, as well as the partial vacuum created at the outlet of the conduit 28, will decrease the load on the blower 16 so that the turbine 26 need not deliver very much power ot the blower. In fact, the turbine 26 and the blower 16 act mainly as boosters to assure that the combustible mixture supplied to the heater unit 22 is sufficiently dense to support combustion. This is of considerable importance in high altitude flying, since at very high altitudes combustion of gasoline cannot be sustained in an internal combustion type heater unless the fuel mixture is supercharged.

The heater unit 22 may be provided with any suitable type of heat exchanger and means for circulating air to be heated over the heat exchanger. If desired, the carburetor 18 may be connected to discharge into the blower 16 instead of being located as shown, in which event the blower will be effective to aid in atomizing the fuel.

While I have shown and described the particular embodiment of my invention, it will be apparent to those skilled in the art that numerous variations and modifications thereof may be made without departing from the underlying principles of the invention. I therefore desire, by the following claims, to include within the scope of my invention all such modifications and variations as will be suggested to those skilled in the art and by which substantially the results of my invention may be obtained by the use of substantially the same or equivalent means.

I claim:

1. In an aircraft heating system having an internal combustion type heater, an air ram, means including a blower receiving air from said ram and supplying a combustible mixture to said heater, a turbine driven by the exhaust gases of combustion from said heater and connected to drive said blower, electric motor means to drive said blower during the starting period, and means for deenergizing said electric motor after substantially normal operation of the heater has been attained.

2. In an aircraft heating system having an internal combustion type heater, an air ram, means including a conduit receiving air from said ram and supplying a combustion mixture to said heater, means in said conduit for increasing the pressure of the mixture supplied to the unit, a turbine driven by gases discharged from said heater, a driving connection from said turbine to said pressure increasing means, and means creating a partial vacuum for discharging the gases of combustion from said turbine to the atmosphere.

3. In an aircraft heating system having an internal combustion type heater, said heater having an electrically energized ignition means, means including a blower for supplying a combustible mixture to said heater, an air ram supplying air to said blower, a turbine driven by the exhaust gases of combustion from said heater and connected to drive said blower, an electric motor connected to drive said blower during the starting period, and a circuit for supplying electrical energy to said motor and to said ignition means, said circuit including a thermostatic switch responsive to the temperature of said heater and operable to open the circuit and thereby deenergize said motor and said ignition means when said heater attains its normal operating temperature.

4. In an aircraft heating system having an internal combustion type heater, an air ram, means including a conduit receiving air from said ram and supplying a combustible mixture to said heater, means in said conduit for increasing the pressure of the mixture supplied to the unit, a turbine driven by gases discharged from said heater, a driving connection from said turbine to said pressure increasing means, motor means to drive said blower, and means to energize said motor only during the heater starting period while said heater is relatively cold and said turbine is ineffective to deliver power.

5. In an aircraft heating system, the combination of an internal combustion type heating unit having an inlet for receiving a supply of a combustible mixture and an outlet for discharging the products of combustion therefrom, a carbureting device connected to said inlet, a blower connected to supply air under pressure to said carbureting device, a ram supplying air to said blower, a turbine connected to said outlet and operated by the products of combustion discharged therefrom, an electric starting motor, a common shaft for the rotors of said blower, said turbine, and said motor, and means including a temperature responsive switch for energizing said motor during the heating unit starting period while said heating unit is relatively cool.

HENRY J. DE N. McCOLLUM.